Patented Dec. 27, 1927.

1,654,242

UNITED STATES PATENT OFFICE.

CHARLES F. ECKART, OF OAKLAND, CALIFORNIA.

METHOD FOR ENHANCING THE GROWTH OF PLANTS.

No Drawing.   Application filed May 19, 1927. Serial No. 192,790.

The invention relates to a method of enhancing the growth and increasing the yield of certain plants, especially perennials like asparagus which sprout from parent stock at seasonal intervals, the method involving a special mulching operation to effect the exclusion of rainfall from the plant beds and facilitate the slow evaporation of moisture contained in said beds prior to and during the period of initial underground growth of the plants and at the same time to increase the temperature of the soil constituting the plant beds or planted areas by the absorption or dissemination of solar heat, the method comprising covering the planted areas prior to and during the period of initial underground growth of the plants with a material substantially impervious to rainwater and pervious to slowly evaporated moisture from the soil, whereby ideal conditions of heat and moisture are maintained to cause earlier sprouting and to effect an optimum growth and development of the plants; the covering material also being of a character to absorb solar heat and transmit the same to the subjacent soil, so that, when the plants have obtained their initial underground development and begun to sprout, and the coverings are removed, the stimulation given the mother root system and the underground buds or other sprouting elements, prior to the removal of the covering material, will insure the continued hastened sprouting and enhanced development of the crop, comprising the plants, for a considerable period, and a relatively large increase in the yield of early harvest will be derived therefrom, together with a substantial gain in the amount of the total crop produced.

As exemplifying the efficacy of the present method, the application of the same to the cultivation of asparagus and the resultant marked increase in the yield as a consequence thereof, will be described. It is well known that the best asparagus producing areas involve relatively light soils that are highly pervious to and retentive of moisture. It is also well known that marketable asparagus shoots spring seasonally from root stock usually established in rows that are hilled up or laid out in ridges. As the more productive asparagus growing sections are usually in the belts of copious rainfalls in the period immediately prior to and during the initial underground growth of the plant, it has been found that the absorption of excessive moisture by the soil of the asparagus beds retards the sprouting of the early shoots and decreases the yield of product at a time when the condition of the market is most favorable, the retardation of the shoots being due chiefly to the lowering of the temperature of the soil by the water absorbed and by the evaporation of the absorbed moisture, and likewise by insufficient aeration of the soil so charged with water.

The conditions referred to occur, for example, in the delta region of California, which is known to be the largest asparagus growing section in the world. In this location, asparagus is grown in ridges or continuous hills in soil which for the most part is fairly high in organic matter and somewhat peaty in character. Under normal conditions, the first shoots of the asparagus usually appear about the middle of February, but not in any quantity. About the first of March, the supply of shoots is increased and from the middle of March onward or until June, the supply is plentiful. The harvesting season ordinarily ends about the first of June, and such shoots as come up subsequently are allowed to go to tops and "ferns", which means that the young shoots instead of being harvested are permitted to grow into mature plants, so that the root stock in the soil may expand and develop into vigorous condition for sprouting a good crop of fresh young shoots the following season. The first frosts in the late fall or early winter kill the mature asparagus plants, which are then cut down and removed or burned and the field put in shape for the sprouting of the next crop of young tender shoots in the succeeding late winter or early spring.

I have discovered a method whereby the soil may be kept drier and warmer during the period of greatest rainfall in the winter time, and a special stimulus thereby be given the "crowns" or bud-bearing parts of the asparagus roots to cause them to sprout earlier on an average than they otherwise would, so that not only an earlier but also a more abundant harvest will result. In accordance with my method, I apply to the ground, as hereinafter set forth in detail, a covering of such a nature as to substantially exclude moisture externally applied, as by natural rainfall, and yet allow a slow evaporation of the moisture from the soil, while at the same time delivering to the soil as much solar heat as possible to maintain the temperature of the soil most favorable to the early development and enhancement of the plant growth. To this end, I use preferably a special form of strip mulch, which is practically impervious to and, therefore, capable of shedding water externally applied, as by natural rainfall thereby preventing the direct entrance of such water into the subjacent soil, but which permits absorption and slow evaporation of a portion of the moisture from the soil through the body of the mulch and which mulch also has inherent heat absorbing qualities, which permit it to take up the solar heat and transfer the same to the subjacent soil containing the plant stock; whereby optimum conditions of temperature and moisture in the soil for enhancing the growth and development of the plants are approximated. It is necessary to provide for this slow evaporation of water from the soil below to take place in order to offset the amount of water gaining entrance laterally under the edges of the mulch, because of the capillary and absorptive characteristics of the soil.

I have found that continuous strips of specially constructed paper comprising a middle layer of asphalt impregnated fibers with upper and lower layers of unimpregnated fibers, the upper surface of this composite paper preferably being black or dark in color to render the same heat absorbing, produce the desired results. This particular type of paper was found to be substantially waterproof or impervious to rainfall, but quite pervious to slow evaporation of moisture from the soil, this moisture condensing on the under side of the paper and being gradually absorbed into the more or less porous fabric thereof, and being gradually dissipated by evaporation. Strips of this paper of suitable width are laid upon and along the rounded tops of the ridges of the asparagus producing area, the edges of the strips being held down by any suitable means, as, for example, by earth thrown on the edges by means of disk plows or hoes, the mulching strips being thus held firmly in position overlying the surface of the soil containing the roots and covering practically the entire plant producing area. These mulching strips are preferably laid in position prior to the initiation of the underground growth of the plants and are maintained in position until the early underground buds are close to their sprouting time or have sprouted and the resulting shoots have begun to emerge through the soil, after which the mulching strips are removed and the development of the plants is permitted to continue under normal natural conditions.

Several large size experiments with this particular type of mulch, of different widths and laid at different times, were carried out in the California section hereinbefore referred to, where the asparagus fields were laid off in rows or ridges thirteen hundred and fifty feet in length and, as the results of all of the tests were consistent with respect to the marked effect of the paper, the application and result of one of the tests will be detailed.

On January 30th, there was laid a number of long strips (in this particular instance forty-eight inches wide) of this special type of mulching paper on a number of rows or ridges of asparagus beds. Each of these rows was approximately one-quarter mile long. At this time, of course, the rows were bare and the strips of paper were superimposed on the ridges in surface contact with the soil, the edges of the paper being held down by means hereinbefore referred to. These mulches were permitted to lie undisturbed until February 26th, when they were removed from the field. It was found that the soil of all the ridges, which had been protected by the mulches between January 30th and February 26th was soft, dry and friable as compared with the soil in the adjacent ridges which had not been so protected, and it was also found that the soil of the underlying asparagus beds was maintained at a higher temperature, as evidenced by repeated observations, than that of the adjacent untreated beds, the reasons for these conditions apparently being as follows:—

1. They contained less moisture;
2. They were protected from the wind and, therefore, from the cooling effect produced by hastened evaporation induced by wind; and
3. The color of the upper surface of the mulching paper being black, considerable solar heat was absorbed by the strips and distributed to the soil. This higher soil temperature prevailed during the time the beds were covered with the mulching strips, and also to a less degree for a considerable period after the paper was removed.

The stimulation given the underground "crowns" or buds by this method was most striking and pronounced. Fifteen cuttings (harvestings) of "green" asparagus shoots were made and the effect of the mulching operation on the sprouting of the buds persisted after the paper had been removed from the field. Up to and including a cutting made on the 27th of March, the total gain in weight of the crop taken from the mulched beds over those to which no paper had been applied was 149%. Furthermore, the average shoot from the ridges which had been mulched was 21% larger than the average shoot from the ridges not so protected. This large gain in the weight of crop taken off during the first stages of the harvest in March was due mainly to the fact that the crop was advanced, so that the shoots which would not have come up until April were induced to sprout in March and, likewise, the shoots which would have come up after the middle of March were forced to sprout during the first half of the month and so on. It will be seen, therefore, that the method not only involves the production of earlier crops, but of larger and far more valuable crops, both as to the extent and quality of the yield.

While the invention has been particularly described with reference to enhancing the growth of asparagus, it will be apparent that it is not limited to this particular application, but may be used with favorable results with other crops where similar conditions prevail.

What I claim is:

1. The method of enhancing the growth of plants which comprises covering the planted or bearing areas, during a period prior to the emergence of the plants above the ground, with a material in surface contact therewith capable of shedding rainfall and of reducing the amount of moisture beneath the same by absorption and evaporation.

2. The method of enhancing the growth of plants which comprises covering the planted or bearing areas, during a period prior to the emergence of the plants above the ground, with a heat-absorbing material in surface contact therewith capable of shedding rainfall and of reducing the amount of moisture beneath the same by absorption and evaporation.

3. The method of enhancing the growth of plants which comprises covering the planted or bearing areas, during a period prior to the emergence of the plants above the ground, with a material in surface contact therewith capable of shedding rainfall and of reducing the amount of moisture beneath the same by absorption and evaporation and removing said covering before the emergence of the plants from the ground.

4. The method of enhancing the growth of plants which comprises covering the planted or bearing areas, during a period prior to the emergence of the plants above the ground, with a heat absorbing material in surface contact therewith capable of shedding rainfall and of reducing the amount of moisture beneath the same by absorption and evaporation and removing said covering before the emergence of the plants from the ground.

5. The method of conditioning soil as to temperature and to moisture content for enhancing the growth of plants which consists in placing in surface contact with the soil a material capable of shedding rainfall, and of reducing the amount of moisture beneath the same by absorption and evaporation.

In testimony whereof I affix my signature.

CHARLES F. ECKART.